US008472517B2

(12) United States Patent
Caster (10) Patent No.: US 8,472,517 B2
(45) Date of Patent: Jun. 25, 2013

(54) SYSTEMS AND METHODS FOR REDUCING THE TOTAL NUMBER OF BITS REQUIRED TO BE TRANSFERRED OVER A COMMUNICATIONS LINK FOR AN IMAGE

(75) Inventor: Kevin S. Caster, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 463 days.

(21) Appl. No.: 12/908,538

(22) Filed: Oct. 20, 2010

(65) Prior Publication Data

US 2012/0099639 A1 Apr. 26, 2012

(51) Int. Cl.
*H04N 11/02* (2006.01)
(52) U.S. Cl.
USPC ............... 375/240.01; 375/240.02; 348/453
(58) Field of Classification Search
USPC .................... 375/240.01, 240.02; 348/453
See application file for complete search history.

(56) References Cited

U.S. PATENT DOCUMENTS

| 4,814,876 | A |   | 3/1989 | Horio et al. | |
|---|---|---|---|---|---|
| 5,150,199 | A | * | 9/1992 | Shoemaker et al. | 348/180 |
| 5,164,827 | A |   | 11/1992 | Paff | |
| 5,500,685 | A |   | 3/1996 | Kokaram | |
| 5,548,659 | A |   | 8/1996 | Okamoto | |
| 5,594,816 | A |   | 1/1997 | Kaplan et al. | |
| 5,844,627 | A |   | 12/1998 | May et al. | |
| 5,960,448 | A |   | 9/1999 | Reichek et al. | |
| 6,343,151 | B1 |   | 1/2002 | King | |
| 7,623,677 | B2 | * | 11/2009 | Girgensohn et al. | 382/103 |
| 2002/0118748 | A1 |   | 8/2002 | Inomata et al. | |
| 2003/0048944 | A1 |   | 3/2003 | De Bonet | |
| 2010/0056920 | A1 | * | 3/2010 | Kim et al. | 600/443 |
| 2010/0321475 | A1 | * | 12/2010 | Cox et al. | 348/47 |

OTHER PUBLICATIONS

European Search Report mailed Jan. 23, 2012, Application Serial No. 11008438.1-2223, in the name of Harris Corporation.

* cited by examiner

*Primary Examiner* — Sath V Perungavoor
*Assistant Examiner* — Jeffrey Williams
(74) *Attorney, Agent, or Firm* — Fox Rothschild, LLP; Robert J. Sacco (57) ABSTRACT

Systems (100) and methods (600) for reducing the total number of bits required to be transferred over a communications link for an image (400) captured by a camera (102). The methods involve receiving, from the camera, original color values for pixels of the image. A first pixel is selected by an encoder (130). Thereafter, the encoder determines whether the first pixel exists outside a region of interest (402) within the image. If the first pixel exists outside the region of interest within the image, then arithmetic operations are performed by the encoder using the original color value for the first pixel. The arithmetic operations are performed to generate a First Modified Color Value (FMCV). Subsequently, image data is compressed using at least the FMCV. Notably, the color represented by FMCV is different than a color represented by the original color value for the first pixel.

23 Claims, 7 Drawing Sheets

SYSTEMS AND METHODS FOR REDUCING THE TOTAL NUMBER OF BITS REQUIRED TO BE TRANSFERRED OVER A COMMUNICATIONS LINK FOR AN IMAGE

BACKGROUND OF THE INVENTION

1. Statement of the Technical Field

The inventive arrangements relate to imaging systems, and more particularly to systems and method for reducing the total number of bits required to be transferred over a communications link for the image.

2. Description of the Related Art

There are various conventional imaging systems known in the art. The conventional imaging systems are often used in the television industry for capturing video and communicating the video to a plurality of remote viewing devices (e.g., televisions and computers). In this regard, each of the conventional imaging systems comprises a camera for capturing images and generating data describing the captured images. The data is subsequently communicated to a video recorder and/or television station. The video recorder records the data for later use. The television station forwards the data to the remote viewing devices via wired and/or wireless communications links. The wired communication links include optical fibers and/or coaxial cables coupled between the television station and the remote viewing devices. The wireless communications links can include optical fibers and/or coaxial cables coupled between the television station and a dish antenna. The dish antenna transmits RF signal including the data to the remote viewing devices via a satellite.

A certain amount of overall bandwidth exists for communicating the data over the optical fibers and/or coaxial cables. The overall bandwidth is shared between a plurality of television channels. In this regard, each television channel is allocated a portion of the overall bandwidth for communicating the data over the optical fibers and/or coaxial cables.

Full High Definition (FHD) video data requires more bandwidth (e.g., 5 Mbit/s) to communicate over the optical fibers and/or coaxial cables than is available for a given television channel. As such, an encoder is typically employed for compressing the FHD video data prior to communication from the camera to the video recorder and/or television station. The data compression is performed to reduce the bandwidth required to communicate the FHD video data (e.g., from 843 Mbit/s to 5 Mbit/s). Additional compression is completed to further reduce the bandwidth required to communicate the FHD video over disadvantage links (e.g., from 5 Mbit/s to 1 Mbit/s). The data compression typically involves the following operations: (a) mapping a plurality of pixels to one pixel (e.g., 4 pixels to one pixel); and/or (b) processing the FHD video data to discard a portion thereof so as to crop the image.

Despite the advantages of the above-described conventional encoding techniques, they suffer from certain drawbacks. For example, in the mapping scenario, the detail of an image is undesirably reduced. In the cropping scenario, graphics existing along a border of an image are eliminated from the image. As a result, situational awareness is undesirably reduced.

Therefore, there is a need for an improved encoding technique that facilitates the transfer of FHD video data over optical fibers and/or coaxial cables without significantly affecting the quality of overall images (i.e., the image fidelity and situational awareness). Also, the improved encoding technique should be useful in military and security applications in which the overall bandwidth available for communicating video data is significantly smaller as compared to that of television applications.

SUMMARY OF THE INVENTION

Embodiments of the present invention concern implementing systems and methods for reducing the total number of bits required to be transferred over a communications link for an image captured by a camera. The image is H pixels high and W pixels wide. The method embodiments involve receiving at an encoder original color values for pixels of the image generated by the camera. At the encoder, a first pixel is selected. Thereafter, a determination is made by the encoder. If the encoder determines that the first pixel exists outside a region of interest within the image, then the encoder performs first arithmetic operations. The region of interest is h pixels high and w pixels wide, where h is less than H and w is less than W. The first arithmetic operations are performed to generate a first modified color value. If the encoder determines that the first pixel does not exist outside the region of interest within the image, then the encoder may optionally perform second arithmetic operations to generate a second modified color value. The original color value for the first pixel is used during the first or second arithmetic operation. Subsequent to the completion of the first or second arithmetic operations, image data is compressed by the encoder using the first modified color value or the second modified color value. Notably, the color represented by the first modified color value is different than a color represented by the original color value for the first pixel. Similarly, the color represented by the second modified color value is different than a color represented by the original color value for the first pixel.

According to an aspect of the present invention, the first modified color value is generated using the following mathematical equation.

$$RGB'=RGB(1-T_1)+(T_1)RGB_{DARKCOLOR}$$

where RGB' represents said first modified color value expressed in an RGB color space format, RGB represents said original color value for said first pixel which is expressed in said RGB color space format, $T_1$ represents a variable, and $RGB_{DARKCOLOR}$ represents a color value for a dark color which is expressed in said RGB color space format.

According to another aspect of the present invention, the first modified color value is generated using the following mathematical equation $$YCbCr'=YCbCr(1-T_1)+(T_1)YCbCr_{DARKCOLOR},$$

where YCbCr' represents said first modified color value expressed in a YCbCr color space format, YCbCr represents said original color value for said first pixel expressed in said YCbCr color space format, $T_1$ represents a variable and $YCbCr_{DARKCOLOR}$ represents a color value for a dark color which is expressed in said YCbCr color space format. In this scenario, the original color value for the first pixel may be converted from an RGB color space format to a YbCrCb color space format.

According to another aspect of the present invention, the second modified color value is generated using the following mathematical equation $$RGB''=RGB(1-T_2)+(T_2)RGB_{LIGHTCOLOR},$$

where RGB'' represents said second modified color value expressed in an RGB color space format, RGB represents said original value for said first pixel expressed in said RGB color space format, $T_2$ represents a variable, and $RGB_{LIGHTCOLOR}$ represents a color value for a light color which is expressed in said RGB color space format.

According to yet another aspect of the present invention, the second modified color value is generated using $$YCbCr''=YCbCr(1-T_2)+(T_2)YCbCr_{LIGHTCOLOR},$$

where $YCbCr''$ represents said second modified color value expressed in a YbCrCb color space format, YCbCr represents said original color value for said first pixel expressed in said YbCrCb color space format, $T_2$ represents a variable and $YCbCr_{LIGHTCOLOR}$ represents a color for a light color expressed in said YbCrCb color space format. In this scenario, the original color value for the first pixel may be converted from an RGB color space format to a YbCrCb color space format.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Embodiments of the present invention generally concern implementing systems and methods for reducing the total number of bits required to be transferred over a communications link for an image. The method embodiments generally involve receiving, from a camera, color values for a plurality of pixels of the image. Thereafter, image tinting operations are performed. The image tinting operations involve generating first modified color values for first pixels which exist outside a region of interest of the image. In addition, the image tinting operations can also involve generating second modified color values for second pixels which exists inside the region of interest of the image. Each of the first and second modified color values is generated using one of the original color values received from the camera. Thereafter, data compression operations are performed using the modified color values.

The present invention has various advantages. For example, the present invention provides a way to pre-process an image to take better advantage of an encoding technique. The pre-processing generally involves applying a tint to at least a portion of an image prior to the performance of an encoding process. The pre-processing facilitates the transfer of FHD video data without significantly affecting the quality of an overall image. In this regard, it should be understood that the fidelity of a particular region (e.g., a center region) of an image is maintained in the present invention. Also, the broad situational awareness of an image is maintained in the present invention. These two features of the present invention maintain a certain level of image quality. The image quality feature of the present invention is at least partially due to the performance of image tinting operations prior to the performance of the data compression operations. Notably, the performance of the image tinting operations does not significantly impact latency experienced in system embodiments of the present invention.

As evident from the above discussion, the systems and methods of the present invention can be used in a variety of applications. Such applications include, but are not limited to, television applications, security applications, military applications, movie applications and other image-based applications. As such, the present invention can be used with a variety of different types of cameras. The cameras can include, but are not limited to, television cameras, Electro-Optical (EO) panchromatic digital video cameras, infrared video cameras, Single Antenna synthetic aperture Radar (SAR) systems or other image capturing devices.

The present invention will now be described in relation to FIGS. 1-6B. Specifically, exemplary systems implementing the present invention are described below in relation to FIGS. 1-5. Exemplary methods of the present invention are described below in relation to FIGS. 6A-6B.

Exemplary System Implementing the Present Invention

Figure 1:
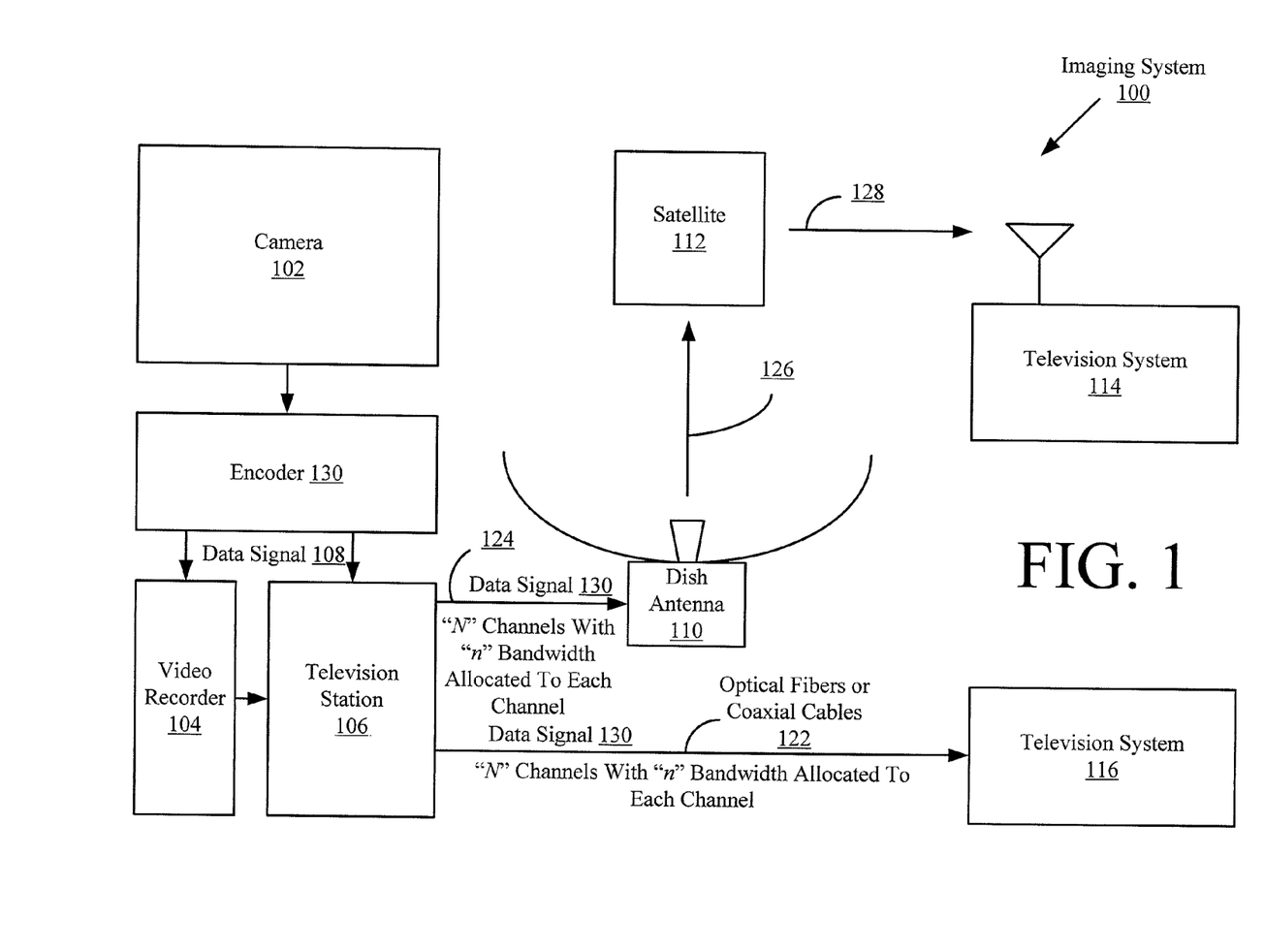
FIG. 1 is a schematic illustration of an exemplary imaging system that is useful for understanding the present invention.

Referring now to FIG. 1, there is provided a schematic illustration of an imaging system 100 that is useful for understanding the present invention. The imaging system 100 will be described herein in relation to a television application. Still, embodiments of the present invention are not limited in this regard.

The imaging system 100 is generally configured to facilitate the capturing of images and the transmission of images to a plurality of remote viewing devices 114, 116. Each of the images is H pixels high and W pixels wide. As such, the imaging system 100 comprises a camera 102, an encoder 130, a video recorder 104, a television station 106, a dish antenna 110, a satellite 112 and the remote viewing devices 114, 116. The remote viewing devices 114, 116 include, but are not limited to, television systems. The remote viewing devices 114, 116 may also include general purpose computers, smart phones and other video display devices.

The camera 102 includes, but is not limited to, a video camera. The camera 102 may be mounted on a fixed structure (e.g., a tree or a building) or a vehicle (e.g., a car or unmanned vehicle). The camera 102 is generally configured to capture images and generate image data describing the captured images. The image data includes original color values for each pixel of the captured image. The image data is subsequently communicated from the camera 102 to the video recorder 104 and/or television station 106 via the encoder 130. An exemplary embodiment of the camera 102 will be described in more detail below in relation to FIG. 2.

The encoder 130 is configured to process the image data for reducing the total number of bits required to be transferred over a communications link for an image. The process performed by the encoder 130 generally involves: processing image data (i.e., original color values) for some or all of the pixels of an image to produce modified image data (i.e., modified color values); and compressing the modified image data. The encoder 130 will be described in more detail below in relation to FIG. 3.

As shown in FIG. 1, a data signal 108 including the compressed image data is communicated from the encoder 130 to the video recorder 104 and/or the television station 106. The video recorder 104 records the compressed image data for later use. The television station 106 generates and forwards a data signal 130 including the compressed image data to the television systems 114, 116 via a wired communications link, a wireless communications link (not shown) and/or a combination wired/wireless communications link 124, 126, 128.

The communication links 122, 124, 126, 128 include optical fibers and/or coaxial cables. As shown in FIG. 1, the wired communication link 122 includes optical fibers and/or coaxial cables coupled between the television station 106 and the television system 116. The combination wired/wireless communications link 124, 126, 128 can include optical fibers and/or coaxial cables coupled between the television station 106 and the dish antenna 110. The dish antenna 110 transmits an RF signal including the compressed image data to the television system 114 via the satellite 112. Still, other wired/wireless link configurations are also possible, and all such wired/wireless links as would be known to one skilled in the art are included in the present invention.

A certain amount of overall bandwidth exists for communicating image data over the communication links 122, 124, 126, 128. The overall bandwidth is typically shared between "N" television channels. Each television channel is allocated a certain amount "n" of the overall bandwidth for communicating the image data over the communication links 122, 124, 126, 128.

Figure 2:
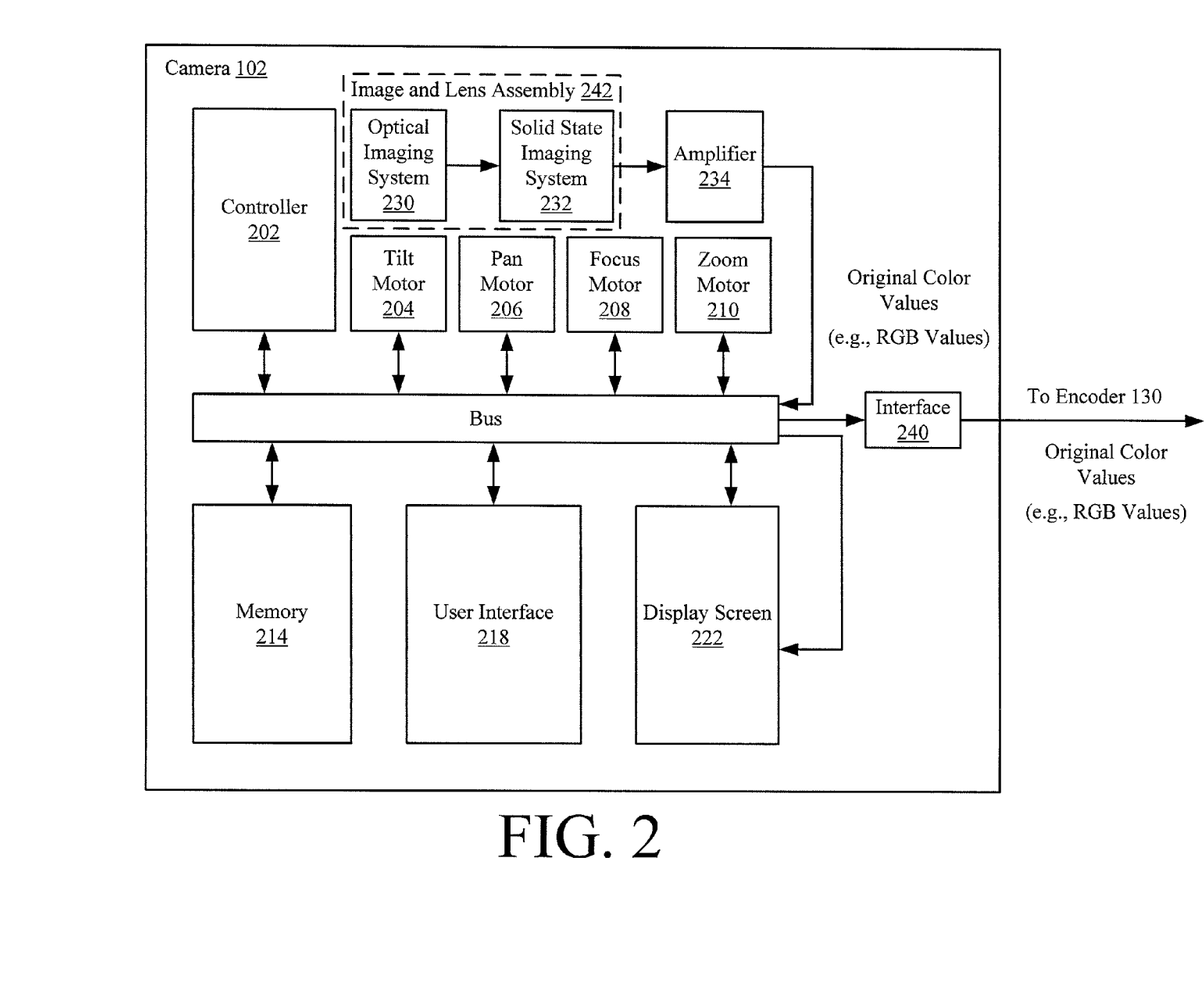
FIG. 2 is a detailed block diagram of an exemplary camera that is useful for understanding the present invention.

Referring now to FIG. 2, there is provided an exemplary block diagram of the camera 102. The hardware architecture of FIG. 2 represents one embodiment of a representative camera 102 configured to facilitate the present invention. As such, the camera 102 includes hardware and software for capturing images, generating image data and viewing captured images.

In the camera 102, an image of interest is focused by an optical imaging system 230 onto a solid state imaging system 232. The solid state imaging system 232 is generally configured to capture and record light. In this regard, the solid state imaging system 232 includes an image sensor. The image sensor can include, but is not limited to, a Charge Coupled Device (CCD) image sensor or a Metal Oxide Semiconductor (MOS) image sensor. CCD and MOS image sensors are well known to those skilled in the art, and therefore will not be described herein. However, it should be understood that the image sensors generate an image signal containing information specifying the color for each pixel of the image. The color specifying information is referred to herein as original color values for pixels of the image.

The original color value for a pixel of the image is typically represented as an RGB value, i.e., a color value expressed in an RGB color space format. The RGB color space format is well known to those skilled in the art, and therefore will not be described herein. However, it should be appreciated that each RGB value is defined as a point in a three dimensional coordinate system having a Red (R) component, a Green (G) component and a Blue (B) component. The range of RGB values can vary depending on the type of camera employed.

In some embodiments of the present invention, the camera 102 supports over sixteen million (16,000,000) active colors. The camera 102 can specify eight (8) bits of red, eight (8) bits of green, and eight (8) bits of blue for each active color. Each eight (8) bit value represents an intensity level of the color red, green or blue between zero (0) and two hundred fifty-five (255). An RGB value for a white pixel is represented as (255,255,255), that is, high-intensity red, green and blue. An RGB value for a red pixel is represented as (255,0,0), that is, high-intensity red, zero intensity green and zero intensity blue. An RGB value for a magenta pixel is represented as (128,0,128), that is, half-intensity red, zero intensity green and half intensity blue. An RGB value for a black pixel is represented as (0,0,0), that is, zero red, green and blue. Embodiments of the present invention are not limited in this regard.

Referring again to FIG. 1, the image signal is communicated from the solid state imaging system 232 to the amplifier 234. The amplifier 234 amplifiers the image signal. Thereafter, the RGB values of the amplified signal are temporarily stored in a memory 214. The RGB values are also communicated to the encoder 130 of FIG. 1 via an interface 240.

The RGB values stored in memory 214 can be retrieved at a latter time for subsequent processing. The RGB values can be retrieved from memory 214 in response to a user input. The user input is inputted into camera 102 using a user interface 218. For example, the RGB values are retrieved from memory 214 in response to a request to view a selected image. In this scenario, an image defined by the retrieved RGB values is displayed on the display screen 222. Embodiments of the present invention are not limited in this regard.

As shown in FIG. 2, the camera 102 can further comprise a plurality of motors 204, 206, 208, 210 which control an image and lens assembly 242. The tilt and pan motors 204, 206 are provided to adjust the tilt and pan angles of the image and lens assembly 242. The tilt and pan angles control the position of the viewing direction or optical axis of the assembly. The focus and zoom motors 208, 210 are provided to adjust the focus and zoom states or conditions of the image and lens assembly 242. Control signals for driving the motors 204, 206, 208, 210 are provided by the controller 202. The motors 204, 206, 208, 210, in turn, communicate information relating to their current positions to the controller 202. Still, the invention is not limited to cameras with motors.

Figure 3:
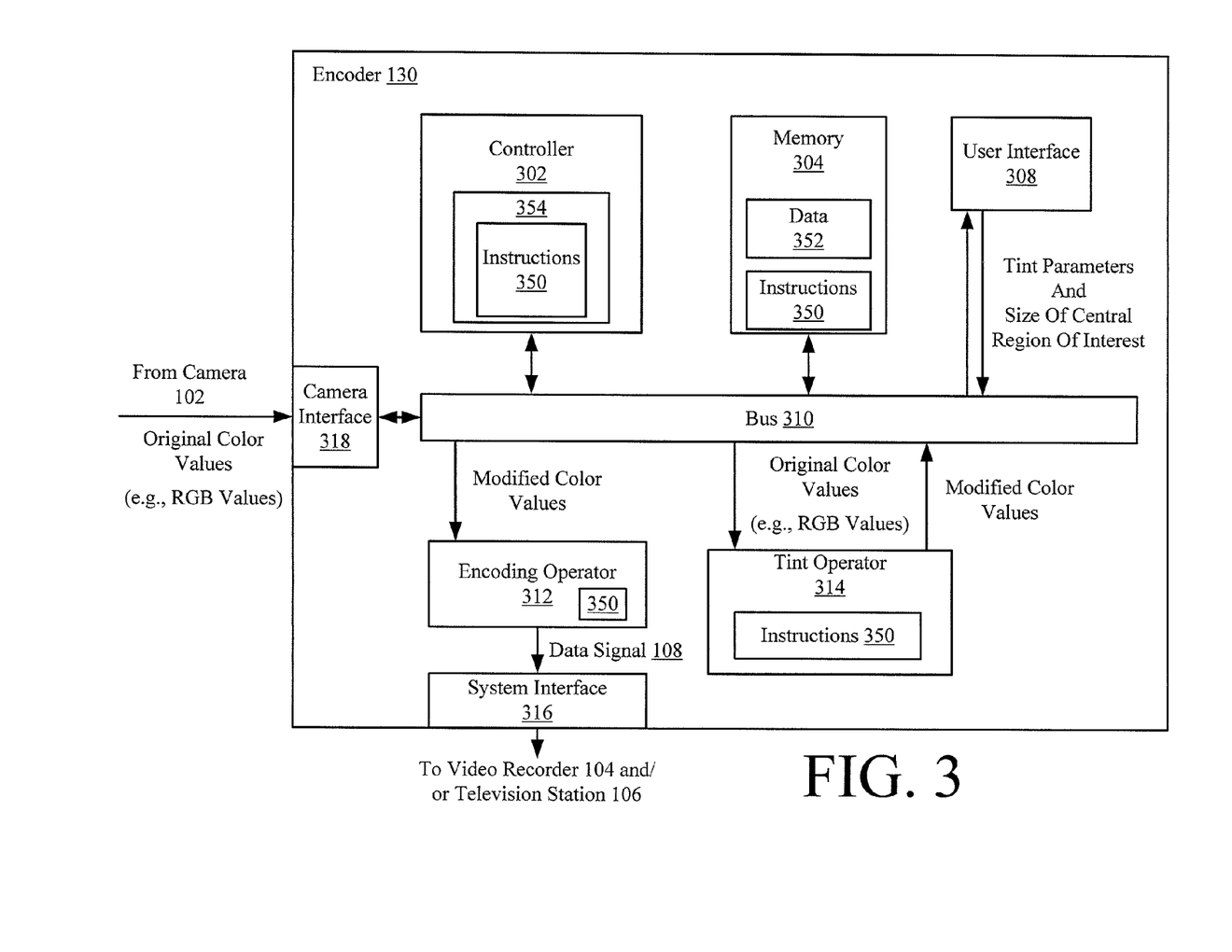
FIG. 3 is a detailed block diagram of an exemplary encoder that is useful for understanding the present invention.

Referring now to FIG. 3, there is provided an exemplary detailed block diagram of the encoder 130 of FIG. 1. The encoder 130 is comprised of a system interface 316, a camera interface 318, a user interface 308, a controller 302, a system bus 310, and a memory 304 connected to and accessible by other portions of the encoder 130 through system bus 310. The encoder 130 is also comprised of a tint operator 314 and an encoding operator 312. Although the operators 312, 314 are shown as entities separated from the controller 302, embodiments of the present invention are not limited in this regard. For example, the components 302, 312 and 314 can be implemented as a single processing device. As such, each of the components 302, 312, 314 includes hardware, software or a combination thereof.

The encoder 130 is coupled to the camera 102 through the camera interface 318. The camera interface 318 receives image data (i.e., original color values) from the camera 102. According to an aspect of the invention, the camera interface 318 is a Universal Serial Bus (USB) interface. USB interfaces are well known to persons skilled in the art. Thus, USB interfaces will not be described herein. However, it should be appreciated that the invention is not limited in this regard and any data interface known in the art can be used without limitation.

At least the controller 302 performs actions involving access to and use of memory 304. Memory 304 may be a RAM, a disk drive, and/or other forms of program bulk-storage. The controller 302 may include microprocessors, ASICs and other hardware. The controller 302 can include one or more microprocessors programmed for retrieving from a memory location an original color value (e.g., an RGB value) for a pixel of an image, communicating the original color value (e.g., an RGB value) to the tint operator 314, receiving modified color values generated by the tint operator 314, storing the modified color values in memory 304, and communicating the modified color values to the encoding operator 312 during an encoding process. An exemplary embodiment of the encoding process will be described below in relation to FIGS. 6A-6C.

The tint operator 314 is generally configured to generate modified color values. In this regard, the tint operator 314 is configured to perform the following operations: selecting a pixel of an image; sending a request for an original color value (e.g., an RGB value) for the selected pixel to the controller 302; receiving the original color value (e.g., an RGB value); generating a modified color value using the received original color value (e.g., an RGB value); and communicating the modified color value to controller 302 for storage in memory 304. The tint operator 314 performs the previously listed operations for each pixel in an image. In some embodiments of the present invention, a single processing element can be used to perform the functions of controller 302 and tint operator 304.

The original color value (e.g., an RGB value) for the pixels can be processed by the tint operator 314 in a certain order selected in accordance with a particular application. For example, the original color value (e.g., an RGB value) for the pixels can be retrieved from memory 304 in a column by column, row by row manner. Alternatively, the original color value (e.g., an RGB value) for the pixels can be retrieved from memory 304 based on whether the pixels exist within or outside a region of interest (e.g., the region of interest 402 of FIG. 4) of the image (e.g., the image 400 of FIG. 4). Embodiments of the present invention are not limited in this regard.

Figure 4:
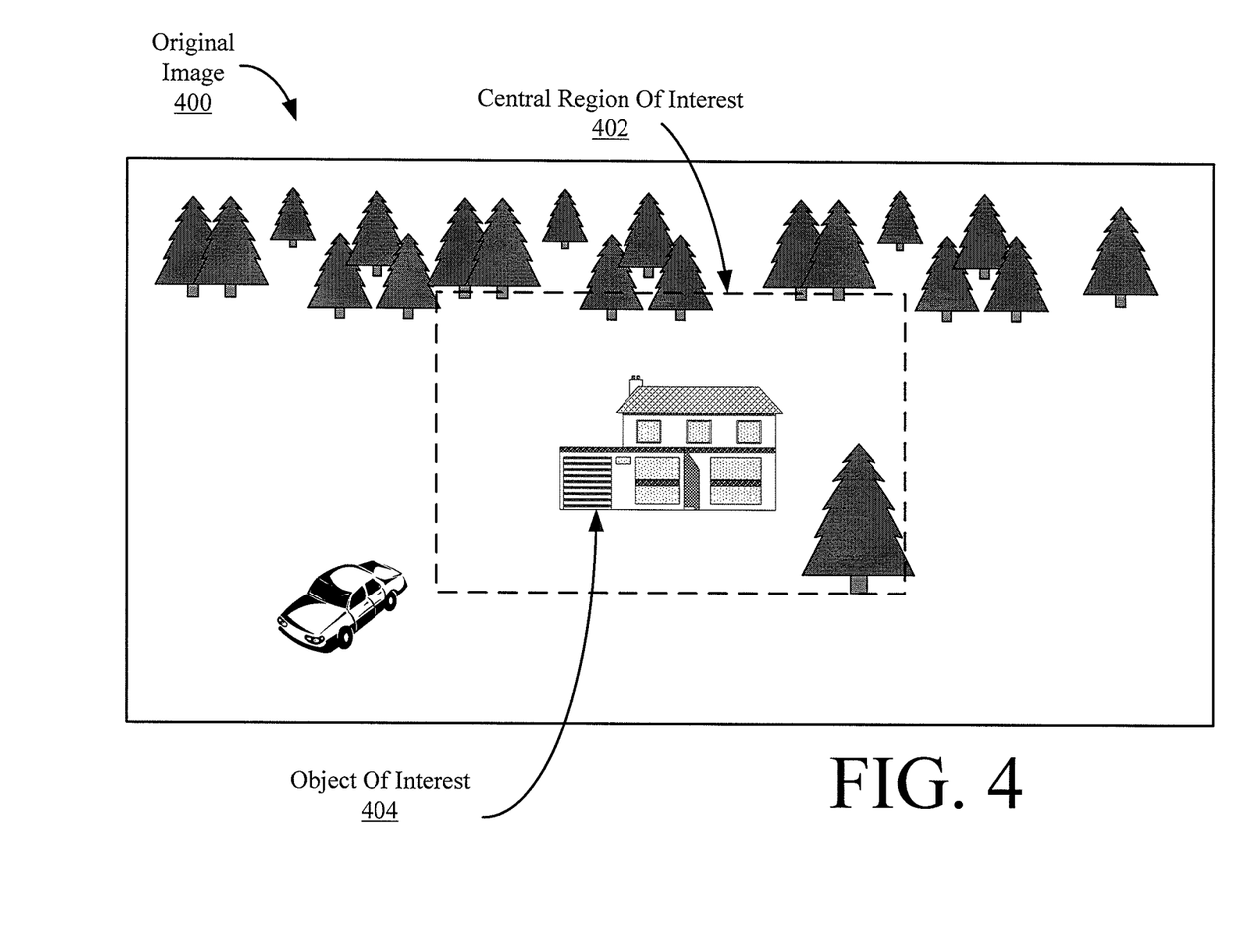
FIG. 4 is a schematic illustration of an exemplary image captured by a camera that is useful for understanding the present invention.

Each of the modified color values can be defined by one of the following mathematical equations (1) and (2).

$$RGB'=RGB(1-T_1)+(T_1)RGB_{DARKCOLOR} \quad (1)$$

$$RGB''=RGB(1-T_2)+(T_2)RGB_{LIGHTCOLOR} \quad (2)$$

where RGB' and RGB" each represent a modified color value generated by the tint operator 314. RGB represents an original color value for a pixel of an original image (e.g., original image 400 of FIG. 4) captured by the camera 102. $T_1$ and $T_2$ each represent a variable. $RGB_{DARKCOLOR}$ represents an RGB value for a dark color (e.g., black). $RGB_{LIGHTCOLOR}$ represents an RGB value for a light color (e.g., white). Each of RGB, RGB', RGB", $RGB_{DARKCOLOR}$ and $RGB_{LIGHTCOLOR}$ is expressed in an RGB color space format.

According to embodiments of the present invention, the RGB value of a pixel is represented as (R,G,B), where each of the R, G and B components has a value between zero (0) and two hundred fifty-five (255). In this scenario, $RGB_{DARKCOLOR}$ is considered to represent an RGB value for the color black. The $RGB_{DARKCOLOR}$ value for the color black is represented as (0,0,0), that is, zero intensity red, green and blue. The $RGB_{LIGHTCOLOR}$ is considered to represent an RGB value for the color white. The $RGB_{LIGHTCOLOR}$ value for the color white is represented as (255, 255, 255), that is high intensity red, green and blue. Accordingly, mathematical equations (1) and (2) can be rewritten as mathematical equations (3) and (4).

$$RGB'=(R,G,B)(1-T_1)+(T_1)(0,0,0) \quad (3)$$

$$RGB''=(R,G,B)(1-T_2)+(T_2)(255,255,255) \quad (4)$$

Note that in mathematical equation (3), the $RGB_{DARKCOLOR}$ term will always be (0,0,0) where the color is black (i.e., $RGB_{BLACK}$=0,0,0). However, if a different tint color is selected (e.g., dark blue, then $RGB_{DARKBLUE}$=128,0,128), then the $RGB_{DARKCOLOR}$ term will include at least one non-zero component. In mathematical equations (3) and (4), the respective R, G and B components are added to obtain RGB'. For example, when adding RGB values (1,2,3) to RGB values (3,4,5), the RGB' value would be (4,6,8). Embodiments of the present invention are not limited in this regard.

The values for the variables $T_1$ and $T_2$ are selected by a user by means of the user interface 308. According to one aspect of the present invention, the variables $T_1$ and $T_2$ can each have a value equal to zero (0), equal to one (1), or between zero (0) and (1) as shown by the following mathematical statements (5) and (6).

$$0 \leq T_1 \leq 1 \quad (5)$$

$$0 \leq T_2 \leq 1 \quad (6)$$

In this scenario, a value of zero (0) indicates that a zero percent (0%) tint is to be applied to the colors of pixels of an original image (e.g., the image 400 of FIG. 4) captured by the camera 102. A value of one half (0.5) indicates that a fifty percent (50%) tint is to be applied to the colors of pixels of the original image (e.g., the image 400 of FIG. 4) captured by the camera 102. A value of one (1) indicates that a one hundred percent (100%) tint is to be applied to the colors of pixels of the original image (e.g., the image 400 of FIG. 4) captured by the camera 102. Embodiments of the present invention are not limited in this regard.

According to embodiments of the present invention, the modified color values (e.g., RGB') are generated by the tint operator 314 for pixels of an image that exist outside a region of interest (e.g., the region of interest 402 of FIG. 4) of the original image (e.g., original image 400 of FIG. 4). The modified color values RGB' provide a tinted image with a tinted portion (e.g., tinted portion 504 of FIG. 5) including pixels existing within the region of interest. The region of interest can include, but is not limited to, a central portion of the original image as shown in FIG. 4. The location and size of the region of interest of the original image is selected by the user using the user interface 308. Embodiments of the present invention are not limited in this regard.

Figure 5:
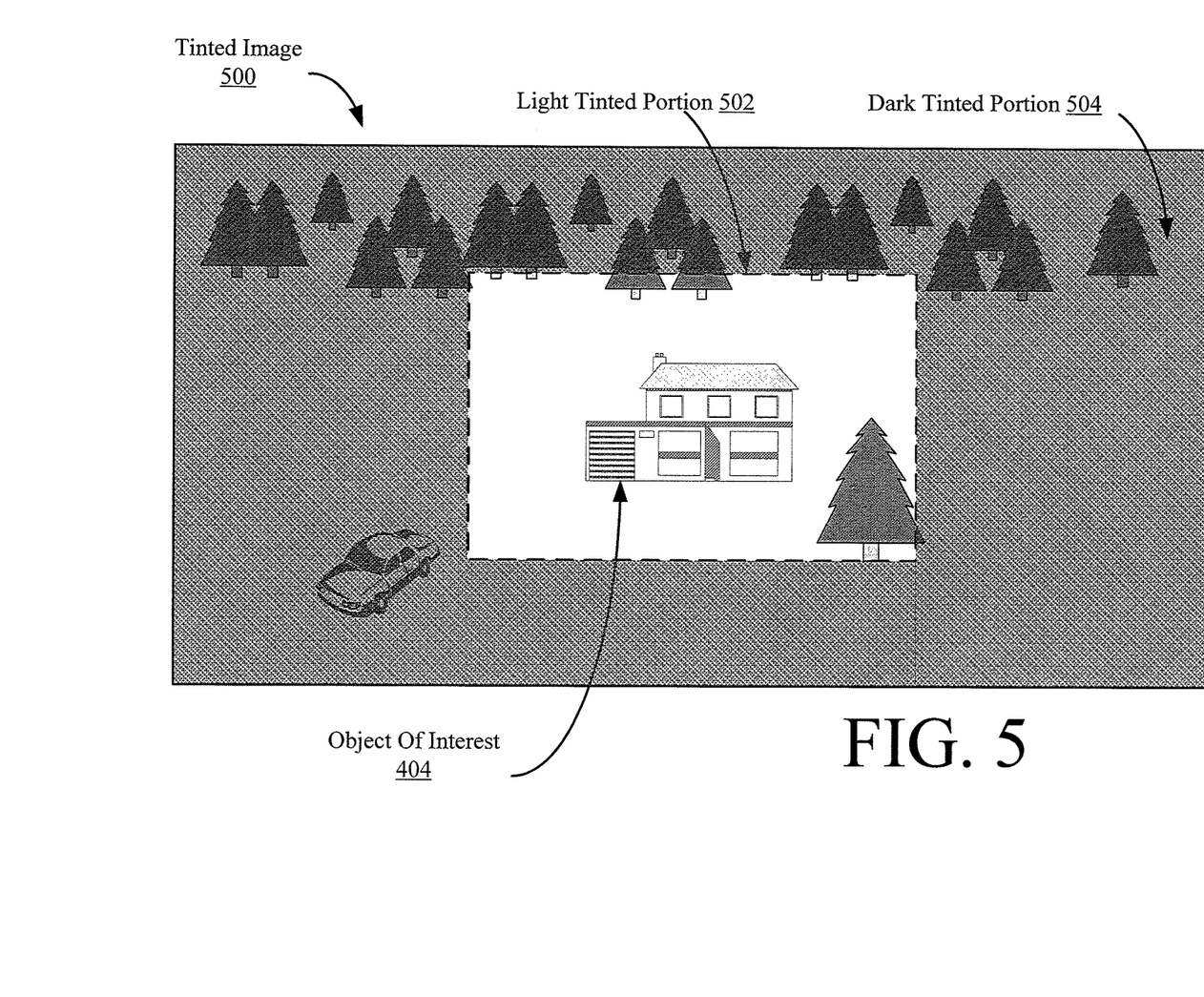
FIG. 5 is a schematic illustration of an exemplary tinted image that is useful for understanding the present invention.

According to other embodiments of the present invention, the modified color values (e.g., RGB') are generated by the tint operator 314 for pixels of an image that exist outside a region of interest (e.g., the region of interest 402 of FIG. 4) of the original image (e.g., original image 400 of FIG. 4). Also, the modified color values (e.g., RGB'') are generated by the tint operator 314 for pixels of an image that exist within the region of interest of the original image. The modified color values define a tinted image, such as the tinted image 500 shown in FIG. 5. As shown in FIG. 5, the tinted image 500 comprises a dark tinted portion 504 and a light tinted portion 502. The dark tinted portion 504 includes pixels which exists outside the region of interest within the image. The light tinted portion 502 includes pixels which exists within the region of interest. Still, embodiments of the present invention are not limited in this regard. The original color values for pixels existing within the region of interest need not be modified. In this regard, it should be appreciated that the modified color values (e.g., RGB'') can be generated for pixels of an image that exist within the region of interest of the original image for various purposes. Such purposes include: the provision of a more esthetically pleasing image to a user; and/or the facilitation of a greater reduction of the total number of bits required to be transferred over a communications link for an image.

The following EXAMPLE 1 is provided for purposes of explaining in more detail the operations performed by the tint operator 314. The present invention is not limited to the contents of EXAMPLE 1.

EXAMPLE 1

A pixel is selected which exists outside a region of interest 402 of an image 400. The pixel is a magenta valued pixel. The original color value for the magenta valued pixel is expressed in an RGB color space representation. As such, the original color value for the magenta valued pixel is referred to here as an RGB value. The RGB value for the magenta valued pixel is represented as (128,0,128), that is, half-intensity red, zero intensity green and half intensity blue. The variable $T_1$ equals one fourth (0.25). Using the RGB value for the magenta valued pixel, the value for $T_1$ and mathematical equation (3), the tint operator 314 computes a modified color value for the selected pixel. In this scenario, the modified color value is defined by the following mathematical equation (7) in which an $RGB_{DARKCOLOR}$ value for the color black is employed.

$$RGB' = (128, 0, 128)(1 - 0.25) + (0.25)(0, 0, 0) \quad (7)$$
$$= (128 \cdot 0.75, 0 \cdot 0.75, 128 \cdot 0.75) +$$
$$(0.25 \cdot 0, 0.25 \cdot 0, 0.25 \cdot 0)$$
$$= (96, 0, 96) + (0, 0, 0)$$
$$= (96 + 0, 0 + 0, 96 + 0)$$
$$= (96, 0, 96)$$

Referring again to FIG. 3, the encoding operator 312 is configured to compress image data using the modified color values generated by the tint operator 314. The data compression is performed by the encoding operator 312 for facilitating the reduction of the bit transfer rate or the total number of bits required to be transferred over a communications link for an image. There are various data compression techniques known in the art. Such well known data compression techniques include, but are not limited to, a Joint Photographic Experts Group (JPEG) data compression technique, a Moving Picture Experts Group (MPEG) data compression technique, an H.263 data compression technique, a Tagged Image File Format (TIFF) data compression technique, and a Portable Network Graphics (PNG) data compression technique. Any known data compression technique can be used with the present invention without limitation.

Notably, some of the known data compression techniques perform compression operations using color values expressed in a YCbCr color space format ("YCbCr values"), instead of color values expressed in an RGB color space format ("RGB values"). The YCbCr color space formats are well known to those skilled in the art, and therefore will not be described herein. However, it should be understood that in scenarios where YCbCr values are used by the encoding operator 312, the modified color values RGB' and/or RGB'' generated by the tint operator 314 are converted to YCbCr values by the encoding operator 312. The RGB value to YCbCr value conversion is defined by the following mathematical equations (8)-(10).

$$Y = 16 + (65.738 \cdot R)/256 + (129.057 \cdot G)/256 + (25.064 \cdot B)/256 \quad (8)$$

$$Cb = 128 + (-37.945 \cdot R)/256 - (74.494 \cdot G)/256 + (112.439 \cdot B)/256 \quad (9)$$

$$Cr = 128 + (112.439 \cdot R)/256 - (94.154 \cdot G)/256 - (18.285 \cdot B)/256 \quad (10)$$

where Y represents a luminous signal. Cb represents a chrominance signal. Cb represents a difference signal. R represents the red component of an RGB value for a pixel. G represents the green component of an RGB value for a pixel. B represents the blue component of an RGB value for a pixel.

Embodiments of the present invention are not limited in this regard. For example, the computations performed by the tint operator 314 to compute a modified color value for a pixel can alternatively be performed in the YCbCr domain, instead of the RGB domain as described above. In this scenario, the RGB values received from the camera are converted to YCbCr values prior to the performance of certain operations by the tint operator 314. In this scenario, mathematical equations (1) and (2) would be expressed as mathematical equations (11) and (12).

$$YCbCr' = YCbCr(1 - T_1) + (T_1)YCbCr_{DARKCOLOR}$$

$$YCbCr'' = YCbCr(1 - T_2) + (T_2)YCbCr_{LIGHTCOLOR} \quad (12)$$

where YCbCr' and YCbCr'' each represent a modified color value generated by the tint operator 314. YCbCr represents an original color value for a pixel of an original image (e.g., original image 400 of FIG. 4) captured by the camera 102. $T_1$ and $T_2$ each represent a variable. $YCbCr_{DARKCOLOR}$ represents a YCbCr value for a dark color (e.g., black). $YCbCr_{LIGHTCOLOR}$ represents a YCbCr value for a light color (e.g., white). Each of YCbCr, YCbCr', YCbCr'', YCbCr DARKCOLOR and $YCbCr_{LIGHTCOLOR}$ is expressed in a YCbCr color space format. If the YCbCr color space format is used, then the encoding operator 312 would be provided with modified YCbCr values computed by the tint operator 314, instead of the modified RGB values (i.e., RGB' and/or RGB'' values) described above.

EXAMPLE 2

A pixel is selected which exists outside the region of interest 402 of an image 400. The pixel is a magenta valued pixel. The original color value for the magenta valued pixel is expressed in an RGB color space format. As such, the original color value for the magenta valued pixel is referred to here as an RGB value. The RGB value for the magenta valued pixel is represented as (128,0,128), that is, half-intensity red, zero intensity green and half intensity blue. The variable $T_1$ equals one fourth (0.25). The YCbCr value for a black valued pixel is represented as (16,128,128). Using the RGB value for the magenta valued pixel, the value for $T_1$ and the YCbCr value for a black valued pixel, the tint operator 314 computes a modified color value YCbCr' for the selected pixel. In this scenario, the RGB value for the magenta valued pixel is converted to a YCbCr value using mathematical equations (8)-(10) presented above. Accordingly, the components of the YCbCr value are defined by the following mathematical equations (13)-(15), respectively.

$$Y=16+(65.738\cdot 128)/256+(129.057\cdot 0)/256+ \\ (25.064\cdot 128)/256=61.401 \quad (13)$$

$$Cb=128+(-37.945\cdot 128)/256-(74.494\cdot 0)/256+ \\ (112.439\cdot 128)/256=165.247 \quad (14)$$

$$Cr=128+(112.439\cdot 128)/256-(94.154\cdot 0)/256- \\ (18.285\cdot 128)/256=175.077 \quad (15)$$

In view of the forgoing, the YCbCr value for the magenta valued pixel is represented as (61.401,165.247,175.077). The YCbCr value for the magenta valued pixel is used by the tint operator 314 to compute the modified color value YCbCr'. The modified color value YCbCr' is defined by the following mathematical equation (16).

$$\begin{aligned} YCbCr' &= YCbCr(1-0.25)+(0.25)YCbCr_{BLACK} \quad (16)\\ &= (61.401, 165.247, 175.077)(1-0.25)+\\ &\quad (0.25)(16, 128, 128)\\ &= (61.401\cdot 0.75, 165.247\cdot 0.75, 175.077\cdot 0.75)+\\ &\quad (0.25\cdot 16, 0.25\cdot 128, 0.25\cdot 128)\\ &= (46.05075, 123.93525, 131.30775)+(4, 32, 32)\\ &= (46.05075+4, 123.93525+32, 131.30775+32)\\ &= (50.05075, 155.93525, 163.30775)\end{aligned}$$

Embodiments of the present invention are not limited to contents of EXAMPLE 2.

Referring again to FIG. 3, the encoding operator 312 generates an output data signal 108 including compressed image data. The output data signal 108 is communicated from the encoding operator 312 to the video recorder 104 and/or the television station 106 via system interface 316.

As shown in FIG. 3, the controller 302 includes a computer-readable storage medium 354 on which is stored one or more sets of instructions 350 (e.g., software code) configured to implement one or more of the methodologies, procedures, or functions described herein. The instructions 350 can also reside, completely or at least partially, within memory 304, encoding operator 312 and/or tint operator 314 during execution thereof by the encoder 130. The memory 305 and at least one component 302, 312, 314 also can constitute machine-readable media. The term "machine-readable media", as used here, refers to a single medium or multiple media that store the one or more sets of instructions 350. The term "machine-readable media", as used here, also refers to any medium that is capable of storing, encoding or carrying a set of instructions 350 for execution by the encoder 130 and that cause the encoder 130 to perform any one or more of the methodologies of the present disclosure.

The following EXAMPLE 3 is provided to explain the advantages of the above described encoder 130 over conventional encoders. Still, the present invention is not limited by the contents of the following EXAMPLE 3.

EXAMPLE 3

Conventional Encoder Operations

Conventional encoders employ a variety of complex encoding algorithms. These complex encoding algorithms include, but are not limited to, JPEG encoding algorithms, MPEG encoding algorithms, H.263 encoding algorithms, TIFF encoding algorithms and PNG encoding algorithms. Since the above-described encoding algorithms are so complex, they will not be considered for the following example. Instead, a simple encoding technique will be considered below for purpose of showing how a reduction in transmitted data bits can be achieved with the present invention. A similar reduction in transmitted data bits will be achieved with more complex encoding algorithms, such as JPEG, MPEG and H.263. The simple encoding technique is generally performed to compress image data using RGB values for all the pixels in an image. The data compression is achieved by: determining an average RGB value of the RGB values for all the pixels in an image; and determining a delta value Δ from each of the RGB values to the average RGB value.

An original image 400 of FIG. 4 is defined by a plurality of pixels. For simplicity purposes, the image is considered to comprise five (5) pixels. The five (5) pixels have RGB values as shown in TABLE 1.

TABLE 1

| | Pixel: | | | | |
| --- | --- | --- | --- | --- | --- |
| | First Pixel | Second Pixel | Third Pixel | Fourth Pixel | Fifth Pixel |
| RGB Value: | (108, 0, 0) | (128, 0, 0) | (148, 0, 0) | (158, 0, 0) | (98, 0, 0) |

The average RGB value of the five (5) pixels is represented as (128,0,0), i.e., (an average R value, an average G value, and average B value). Note that a In this scenario, the delta value Δ for each pixel is shown by the following TABLE 2.

TABLE 2

| | Pixel: | | | | |
| --- | --- | --- | --- | --- | --- |
| | First Pixel | Second Pixel | Third Pixel | Fourth Pixel | Fifth Pixel |
| Δ: | (20, 0, 0) | (0, 0, 0) | (20, 0, 0) | (30, 0, 0) | (30, 0, 0) |

Notably, the delta values Δ may be expressed in a hexadecimal number system representations prior to transmission thereof over a communications link (e.g., communication links 122, 124 of FIG. 1). The hexadecimal number system representations of the above delta values Δ are shown in the following TABLE 3.

TABLE 3

| | Pixel: | | | | |
|---|---|---|---|---|---|
| | First Pixel | Second Pixel | Third Pixel | Fourth Pixel | Fifth Pixel |
| Δ: | (0x14, 0x0, 0x0) | (0x0, 0x0, 0x0) | (0x14, 0x0, 0x0) | (0x1E, 0x0, 0x0) | (0x1E, 0x0, 0x0) |

In TABLE 3, the total number of digits required to be transferred over a communications link for the five (5) pixels is twenty-one (21), i.e., nineteen (19) digits for the five pixels plus two (2) additional bits. The nine-teen (19) digits to be transferred over a communication link are the underlined digits of TABLE 3 (i.e, 14, 0, 0, 0, 0, 0, 14, 0, 0, 1E, 0, 0, 1E, 0, 0). The two (2) additional bits to be transferred over the communication link are bits for the average RGB value (i.e., 128=0x80).

Encoder 130 Operations

Notably, the total number of digits required to be transferred over a communications link for the original image 400 is reduced by the simple compression method described above. Notably, a further reduction of bits to be transferred can be achieved by using the inventive methods and systems described herein. The reduction of the total number of digits will become more evident as the discussion continues.

As described above, the original image 400 of FIG. 4 is defined by a plurality of pixels. For simplicity purposes, the image is considered to comprise five (5) pixels. The five (5) pixels have RGB values as shown above in TABLE 1.

In this example, the encoder 130 of the present invention is considered to employ the same simple compression algorithm as that described above. However, the following example will show that a further reduction in a number of bits transmitted can be achieved by pre-processing the pixels to obtain modified RGB values (as described in relation to mathematical equations (1) and/or (2)). In this example, the modified RGB values are computed using mathematical equation (1) presented above. The $T_1$ value of mathematical equation (1) is considered to have a value equal to 0.5. Also, the $RGB_{DARKCOLOR}$ value of mathematical equation (1) is considered to be an $RGB_{BLACK}$ value (0,0,0). After applying mathematical equation (1) to the RGB values in TABLE 1, we obtain the modified RGB values for the five (5) pixels shown in TABLE 4.

TABLE 4

| | Pixel: | | | | |
|---|---|---|---|---|---|
| | First Pixel | Second Pixel | Third Pixel | Fourth Pixel | Fifth Pixel |
| RGB': | (54, 0, 0) | (64, 0, 0) | (74, 0, 0) | (79, 0, 0) | (49, 0, 0) |

The average RGB value of the five (5) RGB' pixels is (64,0,0). In this scenario, the delta value Δ for each RGB' pixel is shown by the following TABLE 5.

TABLE 5

| | Pixel: | | | | |
|---|---|---|---|---|---|
| | First Pixel | Second Pixel | Third Pixel | Fourth Pixel | Fifth Pixel |
| Δ: | (10, 0, 0) | (0, 0, 0) | (10, 0, 0) | (15, 0, 0) | (15, 0, 0) |

Notably, the delta values Δ are expressed in hexadecimal number system representations prior to transmission thereof over a communications link (e.g., communication links 122, 124 of FIG. 1). The hexadecimal number system representations of the above delta values Δ are shown in the following TABLE 6.

TABLE 6

| | Pixel: | | | | |
|---|---|---|---|---|---|
| | First Pixel | Second Pixel | Third Pixel | Fourth Pixel | Fifth Pixel |
| Δ: | (0xA, 0x0, 0x0) | (0x0, 0x0, 0x0) | (0xA, 0x0, 0x0) | (0xF, 0x0, 0x0) | (0xF, 0x0, 0x0) |

As shown by TABLE 3, the total number of digits required to be transferred over a communications link for the five (5) pixels is seventeen (17), i.e., fifteen (15) bits for the five RGB' pixels plus two (2) bits for the average RGB value (i.e., 64=0x40). The seventeen (17) digits include the fifteen (15) underlined digits of TABLE 6 (i.e, A, 0, 0, 0, 0, 0, A, 0, 0, F, 0, 0, F, 0, 0) and the two (2) underlined digits for the average RGB value (i.e., 40).

Notably, the total number of digits required to be transferred over a communications link for the five (5) pixels in TABLE 4 is less than that required for the original RGB pixels in TABLE 1. The digit reduction of the present invention is at least partially due to the performance of tint operations (using mathematical equations (1) and/or (2)) prior to the performance of data compression operations. Since the number of digits has been reduced, the number of bits which need to be transmitted from the television station 106 to the television systems 114, 116 is also reduced.

Exemplary Methods Implementing the Present Invention

Figure 6A:
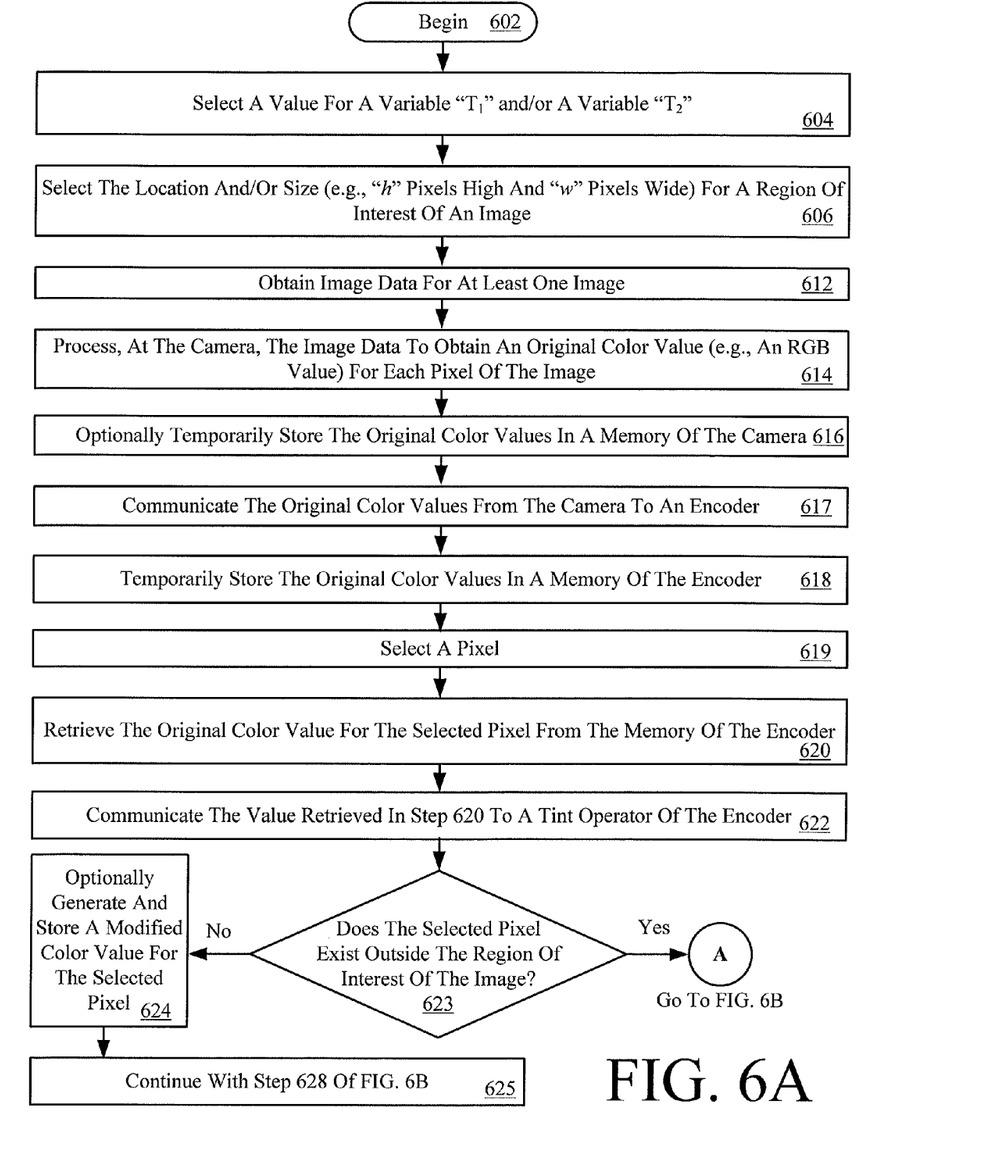
FIGS. 6A-6B collectively provide a flow diagram of an exemplary method for reducing the total number of bits required to be transferred over a communications link for an image.
Figure 6B:
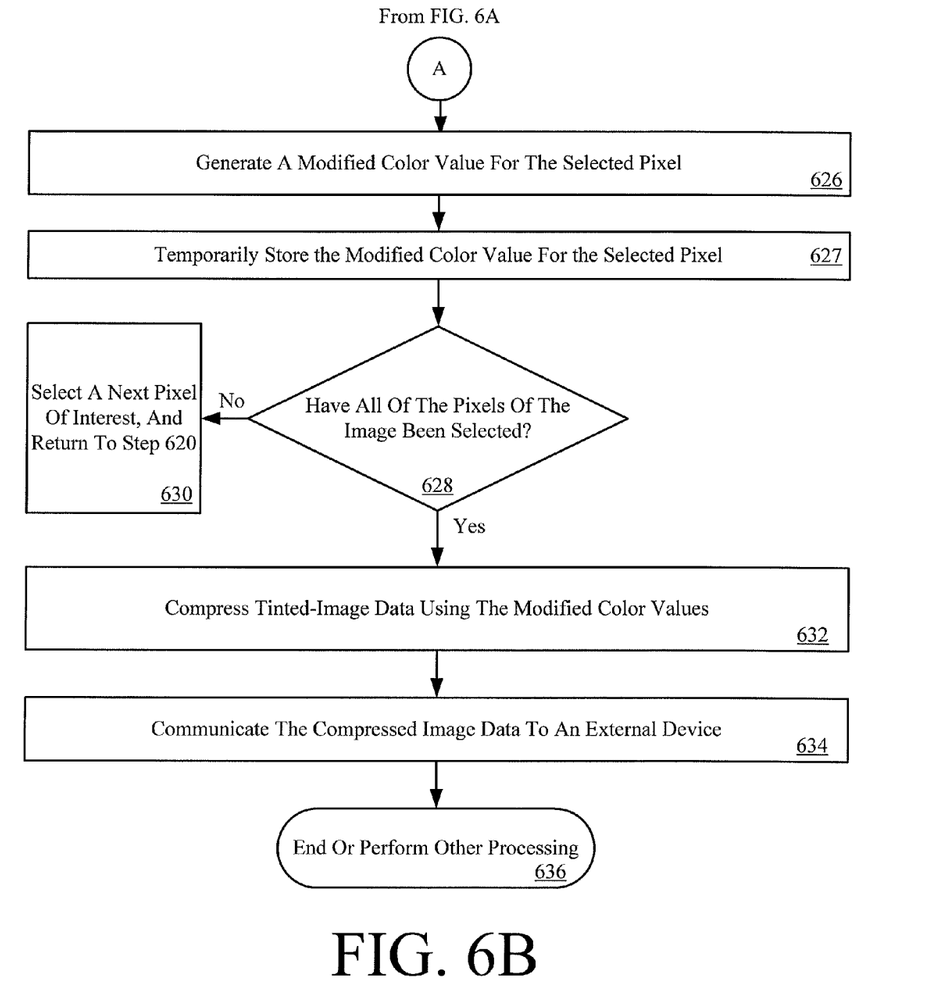

Referring now to FIGS. 6A-6C, there is provided an exemplary method 600 for reducing the total number of bits required to be transferred over a communications link for the image that is useful for understanding the present invention. As shown in FIG. 6A, the method 600 begins with step 602 and continues with step 604. In step 604, a value for a variable "$T_1$" and/or a variable "$T_2$" is selected. Each of the variables "$T_1$" and "$T_2$" can have a value equal to zero (0), equal to one (1) or between zero (0) and one (1). In a next step 606, the location and/or size of a region of interest 404 of an original image 400 is selected. The size of the region of interest is defined by "h" pixels high and "w" pixels wide, where "h" is less than the height H of the image and "w" is less than the width W of the image. Steps 604 and 606 can be achieved using the user interface 308 of the encoder 130.

Upon completing step 606, the method 600 continues with step 612 where image data is obtained. The image data is then processed at the camera in step 614. The image data is processed to obtain an original color value (e.g., an RGB value) for each pixel of the image 400. The original color values (e.g., RGB values) are temporarily stored in a memory 214 of the camera 102, as shown by optional step 616. The original color values (e.g., RGB values) are also communicated from the camera 102 to the encoder 130, as shown by step 617.

At the encoder 130, the original color values (e.g., RGB values) are temporarily stored in an internal memory 304 thereof, as shown by step 618. Subsequently, tint operations are performed by the encoder 130. The tint operations will now be described in relation to steps 619-625 of FIG. 6A and steps 626-630 of FIG. 6B.

In step 619, the tint operator 314 of the encoder 130 selects a pixel of the original image 400. Thereafter in step 620, operations are performed by the encoder 130 to retrieve an original color value (e.g., an RGB value) for the selected pixel from memory 304. After the original color value (e.g., RGB value) has been retrieved from memory 304, it is communicated to the tint operator 314 in step 622 of FIG. 6B. At the tint operator 314, a decision is made as to whether the selected pixel exists outside the region of interest of the image. If the selected pixel does not exist outside the region of interest [623:NO], then the method 600 continues with step 624. In step 624, a modified color value is optionally generated by the tint operator 314 of the encoder 130. The modified color value is then temporarily stored in the memory 304 of encoder 130. The modified color value is generated using the above described mathematical equation (2) or the following mathematical equation (12). In this scenario, mathematical equations (13)-(15) may also be used to convert the original color values for the selected pixel from an RGB color space format ("RGB value") to a YCbCr color space format ("YCbCr value").

If the selected pixel does exist outside the region of interest of the image [623:YES], then the method 600 continues with step 626 of FIG. 6B. In step 626, a modified color value for the selected pixel is generated. The modified color value can be generated in accordance with mathematical equation (1) or mathematical equations (11), (13)-(15) presented above.

Upon completing step 626, step 627 is performed where the modified color value is temporarily stored in a memory 304 of the encoder 130. Thereafter, a decision is made in step 628. The decision involves determining whether all of the pixels of the original image 400 have been selected. If all of the pixels have not been selected [628:NO], then step 630 is performed. In step 630, a next pixel is selected. After the next pixel is selected, the method 600 returns to step 620. If all of the pixels have been selected [628:YES], then step 632 is performed.

In step 632, the modified color values are communicated to the encoding operator 312 of the encoder 130. At the encoding operator 312, image data is compressed using the modified color values. The compressed image data is then communicated to an external device (e.g., the video recorder 104 and/or the television station 106) via a data signal 108, as shown by step 634. Subsequently, step 636 is performed where the method 600 ends or other processing is performed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for reducing the total number of bits required to be transferred over a communications link for an image being H pixels high and W pixels wide, comprising:

receiving, from a camera, original color values for a plurality of pixels of said image;

selecting, by an encoder, a first pixel from said plurality of pixels of said image;

determining, by said encoder, whether said first pixel exists outside a region of interest within said image, said region of interest being h pixels high and w pixels wide, where h is less than H and w is less than W;

performing first arithmetic operations at said encoder using said original color value for said first pixel to generate a first modified color value, if it is determined that said first pixel exists outside said region of interest within said image, comprising generating said first modified color value using a mathematical equation selected from the following two mathematical equations:

$$RGB'=RGB(1-T_1)+(T_1)RGB_{DARKCOLOR}$$

where RGB' represents said first modified color value expressed in an RGB color space format, RGB represents said original color value for said first pixel which is expressed in said RGB color space format, $T_1$ represents a variable, and $RGB_{DARKCOLOR}$ represents a color value for a color which is expressed in said RGB color space format; and $$YCbCr'=YCbCr(1-T_1)+(T_1)YCbCr_{DARKCOLOR},$$

where YCbCr' represents said first modified color value expressed in a YCbCr color space format, YCbCr represents said original color value for said first pixel expressed in said YCbCr color space format, $T_1$ represents a variable and $YCbCr_{DARKCOLOR}$ represents a color value for a color which is expressed in said YCbCr color space format; and performing image compression operations using input data comprising at least said first modified color value;

wherein a color represented by said first modified color value is different than a color represented by said original color value for said first pixel.

2. The method according to claim 1, further comprising performing a user-interactive session to select a value for h and w.

3. The method according to claim 1, further comprising selecting said region of interest to be located in a central portion of said image.

4. The method according to claim 1, further comprising performing a user-interactive session to select a value for $T_1$.

5. The method according to claim 1, further comprising performing second arithmetic operations, by said encoder, using said original color value for said first pixel to generate a second modified color value if it is determined that said first pixel does not exist outside said region of interest within said image.

6. The method according to claim 5, wherein said second modified color value is generated using the following mathematical equation $$RGB''=RGB(1-T_2)+(T_2)RGB_{LIGHTCOLOR},$$

where RGB" represents said second modified color value expressed in an RGB color space format, RGB represents said original value for said first pixel expressed in said RGB color space format, $T_2$ represents a variable, and $RGB_{LIGHTCOLOR}$ represents a color value for a color which is expressed in said RGB color space format.

7. The method according to claim 6, further comprising performing a user-interactive session to select a value for $T_2$.

8. The method according to claim 5, wherein said second modified color value is generated using $$YCbCr''=YCbCr(1-T_2)+(T_2)YCbCr_{LIGHTCOLOR},$$

where YCbCr" represents said second modified color value expressed in a YbCrCb color space format, YCbCr represents said original color value for said first pixel expressed in said YbCrCb color space format, $T_2$ represents a variable and $YCbCr_{LIGHTCOLOR}$ represents a color for a color expressed in said YbCrCb color space format.

9. The method according to claim 5, further comprising performing image compression operations using input data comprising at least said second modified color value.

10. A system, comprising:
an encoder comprising a memory having stored thereon instructions, which when executed by said encoder, cause said encoder to perform the following operations comprising:
receive original color values for a plurality of pixels of an image captured by a camera, said image being H pixels high and W pixels wide;
select a first pixel from said plurality of pixels of said image;
determine whether said first pixel exists outside a region of interest within said image, said region of interest being h pixels high and w pixels wide, where h is less than H and w is less than W;
perform first arithmetic operations using said original color value for said first pixel to generate a first modified color value, if it is determined that said first pixel exists outside said region of interest within said image, using the following mathematical equation:

$$RGB'=RGB(1-T_1)+(T_1)RGB_{DARKCOLOR}$$

where RGB' represents said first modified color value expressed in an RGB color space format, RGB represents said original color value for said first pixel which is expressed in said RGB color space format, $T_1$ represents a variable, and $RGB_{DARKCOLOR}$ represents a color value for a color which is expressed in said RGB color space format; and
perform image compression operations using input data comprising at least said first modified color value;
wherein a color represented by said first modified color value is different than a color represented by said original color value for said first pixel.

11. The system according to claim 10, wherein said encoder is further caused to receive user-selected values for h and w.

12. The system according to claim 10, wherein said region of interest is selected to be located in a central portion of said image.

13. The system according to claim 10, wherein said encoder is further caused to receive a user-selected value for $T_1$.

14. The system according to claim 10, wherein said encoder is further caused to perform second arithmetic operations using said original color value for said first pixel to generate a second modified color value, if it is determined that said first pixel does not exist outside said region of interest within said image.

15. The system according to claim 14, wherein said second modified color value is generated using the following mathematical equation $$RGB''=RGB(1-T_2)+(T_2)RGB_{LIGHTCOLOR}$$

where RGB" represents said second modified color value expressed in an RGB color space format, RGB represents said original value for said first pixel expressed in said RGB color space format, $T_2$ represents a variable, and $RGB_{LIGHTCOLOR}$ represents a color value for a color which is expressed in said RGB color space format.

16. The system according to claim 15, wherein said encoder is further caused to receive a user-selected value for $T_2$.

17. The system according to claim 14, wherein said second modified color value is generated using $$YCbCr''=YCbCr(1-T_2)+(T_2)YCbCr_{LIGHTCOLOR}$$

where YCbCr" represents said second modified color value expressed in a YbCrCb color space format, YCbCr represents said original color value for said first pixel expressed in said YbCrCb color space format, $T_2$ represents a variable and $YCbCr_{LIGHTCOLOR}$ represents a color value for a color expressed in said YbCrCb color space format.

18. The system according to claim 14, wherein said encoder is further caused to compress said image data using at least said second modified color value.

19. A system, comprising:
a camera configured to capture images and generate image data describing the captured images; and
an encoder communicatively coupled to said camera, said encoder comprising a memory having stored thereon instructions, which when executed by said encoder, cause said encoder to perform the following operations comprising:
receive original color values for a plurality of pixels of an image captured by said camera, said image being H pixels high and W pixels wide;
select a first pixel from said plurality of pixels of said image;
determine whether said first pixel exists outside a region of interest within said image, said region of interest being h pixels high and w pixels wide, where h is less than H and w is less than W;
perform first arithmetic operations using said original color value for said first pixel to generate a first modified color value, if it is determined that said first pixel exists outside said region of interest within said image, using the following mathematical equation:

$$YCbCr'=YCbCr(1-T_1)+(T_1)YCbCr_{DARKCOLOR}$$

where YCbCr' represents said first modified color value expressed in a YCbCr color space format, YCbCr represents said original color value for said first pixel expressed in said YCbCr color space format, $T_1$ represents a variable and $YCbCr_{DARKCOLOR}$ represents a color value for a color which is expressed in said YCbCr color space format; and
perform image compression operations using input data comprising at least said first modified color value;
wherein a color represented by said first modified color value is different than a color represented by said original color value for said first pixel.

20. The system according to claim 19, wherein said encoder is further caused to perform second arithmetic operations using said original color value for said first pixel to generate a second modified color value, if it is determined that said first pixel does not exist outside said region of interest within said image.

21. The system according to claim 20, wherein said second modified color value is generated using the following mathematical equation $$RGB''=RGB(1-T_2)+(T_2)RGB_{LIGHTCOLOR}$$

where RGB" represents said second modified color value expressed in an RGB color space format, RGB represents said original value for said first pixel expressed in said RGB color space format, $T_2$ represents a variable, and $RGB_{LIGHTCOLOR}$ represents a color value for a color which is expressed in said RGB color space format.

22. The system according to claim 20, wherein said second modified color value is generated using $$YCbCr'' = YCbCr(1-T_2) + (T_2)YCbCr_{LIGHTCOLOR},$$

where $YCbCr''$ represents said second modified color value expressed in a YbCrCb color space format, $YCbCr$ represents said original color value for said first pixel expressed in said YbCrCb color space format, $T_2$ represents a variable and $YCbCr_{LIGHTCOLOR}$ represents a color value for a color expressed in said YbCrCb color space format.

23. The system according to claim 20, wherein said encoder is further caused to compress said image data using at least said second modified color value.

* * * * *